UNITED STATES PATENT OFFICE.

EGBERT JUDSON, OF SAN FRANCISCO, CALIFORNIA, ASSIGNOR TO THE GIANT POWDER COMPANY AND ATLANTIC GIANT POWDER COMPANY, OF SAME PLACE.

IMPROVEMENT IN EXPLOSIVE COMPOUNDS, OR GIANT POWDER.

Specification forming part of Letters Patent No. 139,468, dated June 3, 1873; application filed May 13, 1873.

*To all whom it may concern:*

Be it known that I, EGBERT JUDSON, of the city and county of San Francisco and State of California, have invented a new and useful Composition of Matter as an Explosive Compound; and I do hereby declare that the following is a description and specification thereof, premising, however, that in stating the proportions of the several ingredients constituting my new explosive compound I do not wish to limit myself to the exact relative quantities hereinafter stated, as they are susceptible of variation; nor to the precise substances mentioned, as some of them have well-known equivalents which may be substituted in their place.

I will proceed to state the ingredients of my new explosive compound, and their relative proportions as I prefer to use them, and will then mention some of the modifications which may be adopted.

I take forty parts by weight of nitrate of soda; six parts by weight of rosin; six parts by weight of sulphur; eight parts by weight of infusorial earth, or other analogous absorbent substances. These ingredients are dried, separately pulverized, and then intimately mixed, composing what I call the dry mixture. I then add to the dry mixture forty parts by weight of nitro-glycerine, making in all one hundred parts by weight, the nitro-glycerine being thoroughly stirred into the dry mixture until it is absorbed thereby, forming a powder of uniform consistency, which constitutes my improved explosive compound, and which I call "Giant Powder, No. 2."

Instead of the nitrate of soda, other nitrates, such as nitrate of baryta, nitrate of lead, or nitrate of potash, may be used; the last-named ingredient being superior to, but more costly than, the nitrate of soda. In place of rosin I have used other carbons and hydrocarbons, such, for example, as bituminous coal, coke, charcoal, flour, starch, sugar, lignite, wood, and asphaltum, which, unless already in that condition, should be pulverized. The absorbent which I prefer to use is silicious matter, composed of the remains of organic substances, and known as infusorial earth, which, being cellular in character, acts as a sponge to hold the nitro-glycerine in intimate mixture. It also performs an important function in preventing the caking of the other ingredients when moistened with nitro-glycerine, and serves to keep the compound in a mealy and pulverulent condition, which is so important to its convenient use for blasting purposes. Other analogous absorbent substances may be substituted for it.

On the quantity of nitro-glycerine employed will depend the effective strength and ready explosiveness of the powder, both of which qualities are increased by the addition of nitro-glycerine. The proportion of nitro-glycerine used may vary from about ten per cent. by weight of the whole mass, up to the largest percentage that the dry mixture will permanently retain; the absorbent quality of the dry mixture varying with the kind and relative quantity of the particular ingredients used. Care should be taken, however, that the nitro-glycerine be not used in such quantity as to run from the mixture after standing, as this would render it dangerous to handle. It should be noticed also that the dry mixture will retain a larger quantity of nitro-glycerin in cold weather than when the temperature is warmer.

The peculiar advantages of the compound which I have described, as an explosive compound, are, that it is more powerful than a mere mixture of the same amount of nitro-glycerine and infusorial earth would be, owing to the presence of the nitrate, carbon, and sulphur, and that it is capable of being made more powerful than a mixture of nitro-glycerine with the three last-named ingredients, without the infusorial earth, as it will hold a larger quantity of nitro-glycerine in a given amount of powder, and that it is very safe, as it does not explode by mere contact with flame, nor will it readily explode by concussion, or by any known means other than by the use of detonatives, such as fulminate of mercury. It may, therefore, be handled and transported with impunity. And in this connection I may state that the best method of exploding this powder with which I am acquainted is to insert into the charge of powder a strongly-charged percussion cap at the end of a fuse, the cap containing about five grains of fulminate of mercury. Another advantage is the cheapness of my explosive powder, arising from the simplicity of the process of manufacture, and the low price of the materials mixed with the nitro-glycerine, as the powder will be almost if not quite as efficient if made from crude instead of refined niter and sulphur. So, also, the materials do not need to be very finely pulverized, nor is any special skill required in the mixing, although the purer the materials and the more perfectly they are mixed the better will be the quality of the powder.

Having thus described my invention, what I claim as such, and desire to secure by Letters Patent, is—

The composition of matter, hereinbefore described, consisting of nitro-glycerine intimately mixed with pulverized infusorial earth, nitrate of soda, rosin, and sulphur, or their equivalents, substantially as described, as a new explosive compound.

EGBERT JUDSON.

Witnesses:
ALFRED RIX,
J. F. COWDERY.